(12) United States Patent
Drake

(10) Patent No.: US 11,331,971 B2
(45) Date of Patent: May 17, 2022

(54) DUAL MODE VEHICLE THAT OPERATES ON BOTH GUIDED RAILS AND UNGUIDED ROADWAYS

(71) Applicant: Owen G. Drake, Oakland, CA (US)

(72) Inventor: Owen G. Drake, Oakland, CA (US)

( * ) Notice: Subject to any disclaimer, the term of this patent is extended or adjusted under 35 U.S.C. 154(b) by 303 days.

(21) Appl. No.: 16/742,554

(22) Filed: Jan. 14, 2020

(65) Prior Publication Data
US 2020/0223268 A1 Jul. 16, 2020

Related U.S. Application Data

(60) Provisional application No. 62/792,285, filed on Jan. 14, 2019.

(51) Int. Cl.
*B60F 1/00* (2006.01)
*B60F 1/04* (2006.01)

(52) U.S. Cl.
CPC .......... *B60F 1/043* (2013.01); *B60F 2301/04* (2013.01)

(58) Field of Classification Search
CPC .... B60F 1/00; B60F 1/005; B60F 1/02; B60F 1/04; B60F 1/046; B60F 1/043; B60F 2301/04; B60B 19/02
See application file for complete search history.

(56) References Cited

U.S. PATENT DOCUMENTS

| | | | |
|---|---|---|---|
| 2,002,901 A * | 5/1935 | Main | B60F 1/043 105/215.2 |
| 2,267,254 A * | 12/1941 | Reilley | B60F 3/00 180/21 |
| 2,718,195 A * | 9/1955 | Bock | B61J 3/12 105/26.1 |
| 3,905,323 A * | 9/1975 | Kacere | B60F 3/00 114/39.23 |
| 4,791,871 A * | 12/1988 | Mowll | B61B 15/00 104/94 |
| 5,289,778 A * | 3/1994 | Romine | B61B 15/00 104/88.04 |
| 6,298,934 B1 | 10/2001 | Shteingold | |
| 6,810,817 B1 | 11/2004 | James | |

FOREIGN PATENT DOCUMENTS

| | | |
|---|---|---|
| CN | 208947009 U | 6/2019 |
| RU | 2551774 C1 | 5/2015 |
| RU | 173152 U1 | 8/2017 |
| RU | 2733672 C1 | 10/2020 |
| WO | WO1991018777 A1 | 12/1991 |
| WO | WO2017206905 A1 | 12/2017 |

\* cited by examiner

*Primary Examiner* — Mark T Le

(57) ABSTRACT

A dual mode vehicle that operates on both guided rails and roadways includes a capsule, a carriage, a left motor, a right motor, a road drive system, a rail drive system, a pod control unit, and at least one battery. The carriage includes a spherical frame-housing, a left wheel housing, and a right wheel housing. A spherical cabin of the capsule is attitudinally mounted within the spherical frame-housing. The left motor is adjacently mounted to the left wheel housing. The right motor is adjacently mounted to the right wheel housing. The left and right motors are operatively coupled with the road drive system through the at least one battery and the pod control unit to operate a roadways transportation mode. The left and right motors are operatively coupled with the rail drive system through the at least one battery and the pod control unit to operate a railway transportation mode.

16 Claims, 11 Drawing Sheets

DUAL MODE VEHICLE THAT OPERATES ON BOTH GUIDED RAILS AND UNGUIDED ROADWAYS

The current application claims a priority to the U.S. Provisional Patent application Ser. No. 62/792,285 filed on Jan. 14, 2019.

FIELD OF THE INVENTION

The present invention relates generally to a transportation vehicle. More specifically, the present invention relates to a dual mode vehicle which operates on both guided rails and unguided roadways with two different drive modes.

BACKGROUND OF THE INVENTION

Transportation system usually includes transportation infrastructure and vehicles. Modern transportation infrastructure includes roadways, railways, airways, waterway, etc. Among others, roadways and railways are the most important ways to move passengers and freight. However, they are also burdened by many disadvantages. For roadways systems, such as the highway system, safety is a significant concern due to the fact that the roadways are traveled by personally owned and driven vehicles. The speeds and directions of the vehicles are determined solely by the judgment or desire of the driver. Moreover, conventional roadways systems also suffer from the drawbacks of traffic jams and inefficient use of energy resources.

Trains usually include multiples of passenger or freight cars which are hauled by a separate locomotive. Trains are beneficial in that they travel on guided rails and thus are safe to travel on. However, railway transport cannot provide door to door service as they are tied to a particular track. The routes and timings of the trains are usually fixed and cannot be adjusted according to individual requirements. Also, railway transport is unsuitable and uneconomical for short distance and small loads due to the high operating cost.

The present invention aims to solve some of these problems by disclosing a dual mode vehicle which benefits from both the roadways transportation system and railways transportation system. More specifically, the present invention is a battery powered vehicle and utilizes a retractable wheel assembly system to drive on roadways and an integrated rail mount system to drive on railways.

SUMMARY OF THE INVENTION

The present invention is a dual mode vehicle which can operate with two different drive modes. In a first operational mode, the vehicle functions as an electrically operated pod and travels along two elevated rails. In a second operational mode, the vehicle is able to act as a wheeled electric car to travel on conventional roadways. The present invention has the advantages of simple transition to and from the rails, comfort, and improved safety.

DETAIL DESCRIPTIONS OF THE INVENTION

All illustrations of the drawings are for the purpose of describing selected versions of the present invention and are not intended to limit the scope of the present invention.

Figure 1:
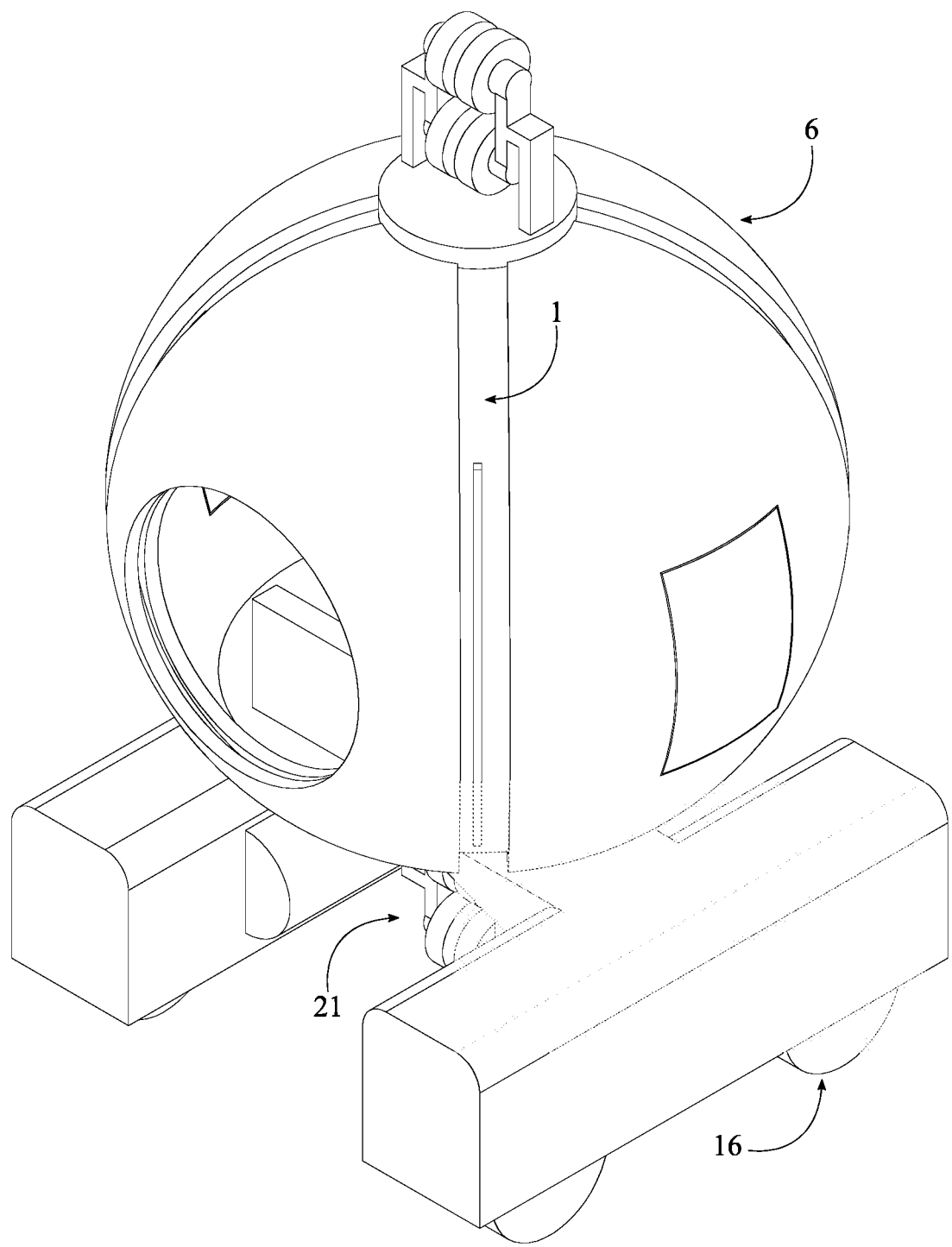
FIG. 1 is a top perspective view for an exemplary embodiment of the present invention.
Figure 2:
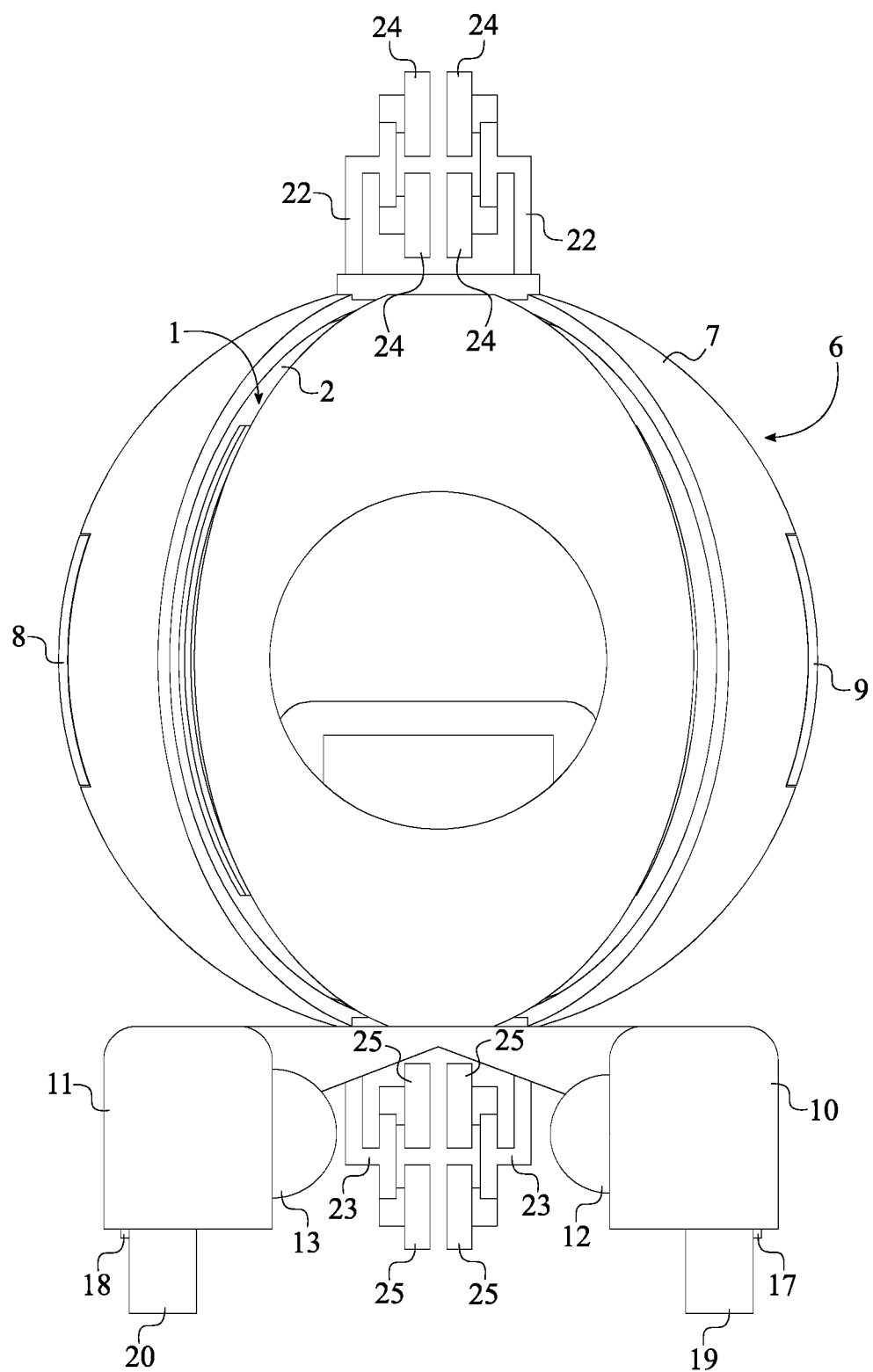
FIG. 2 is a front view for an exemplary embodiment of the present invention.
Figure 3:
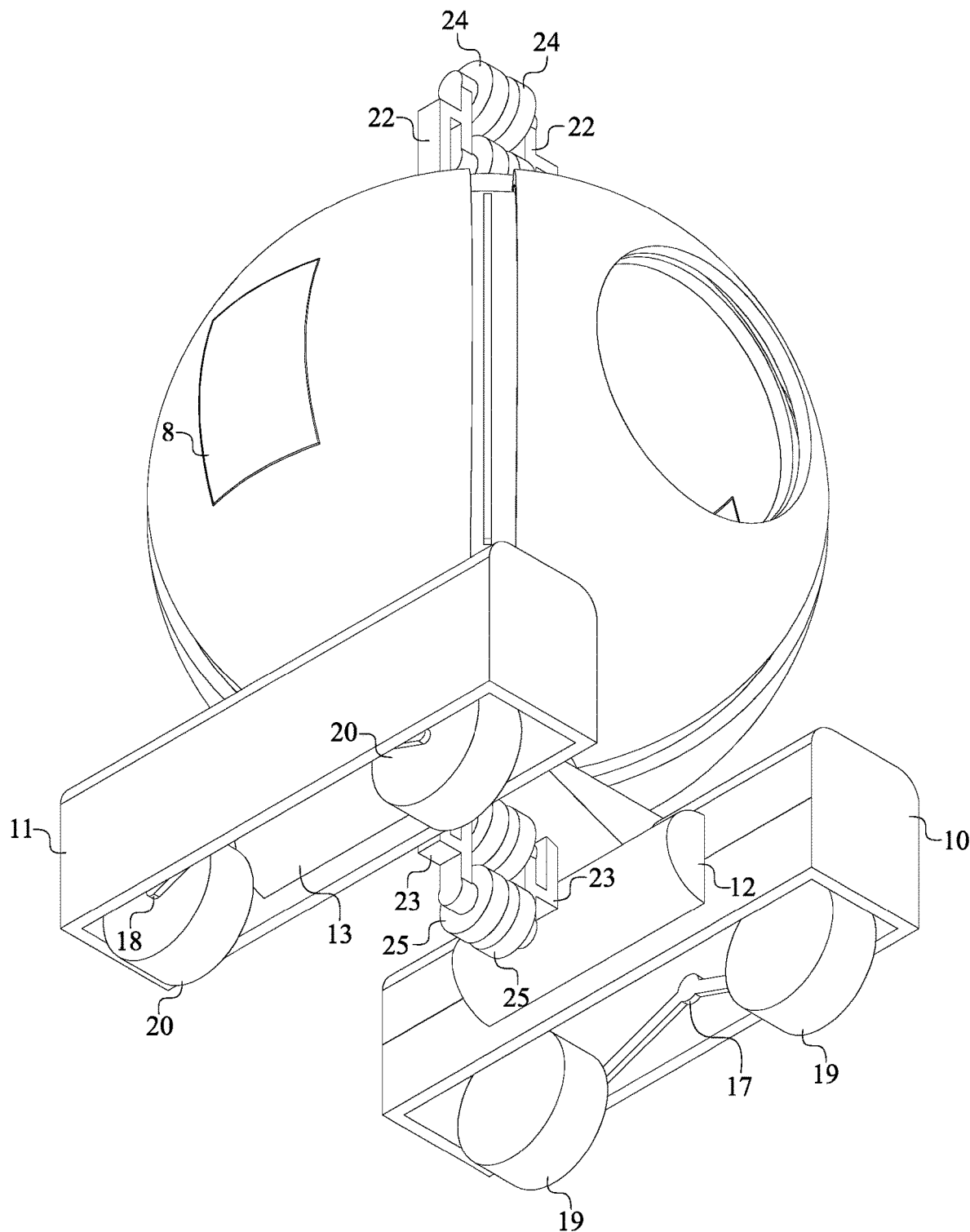
FIG. 3 is a bottom perspective view for an exemplary embodiment of the present invention.
Figure 4:
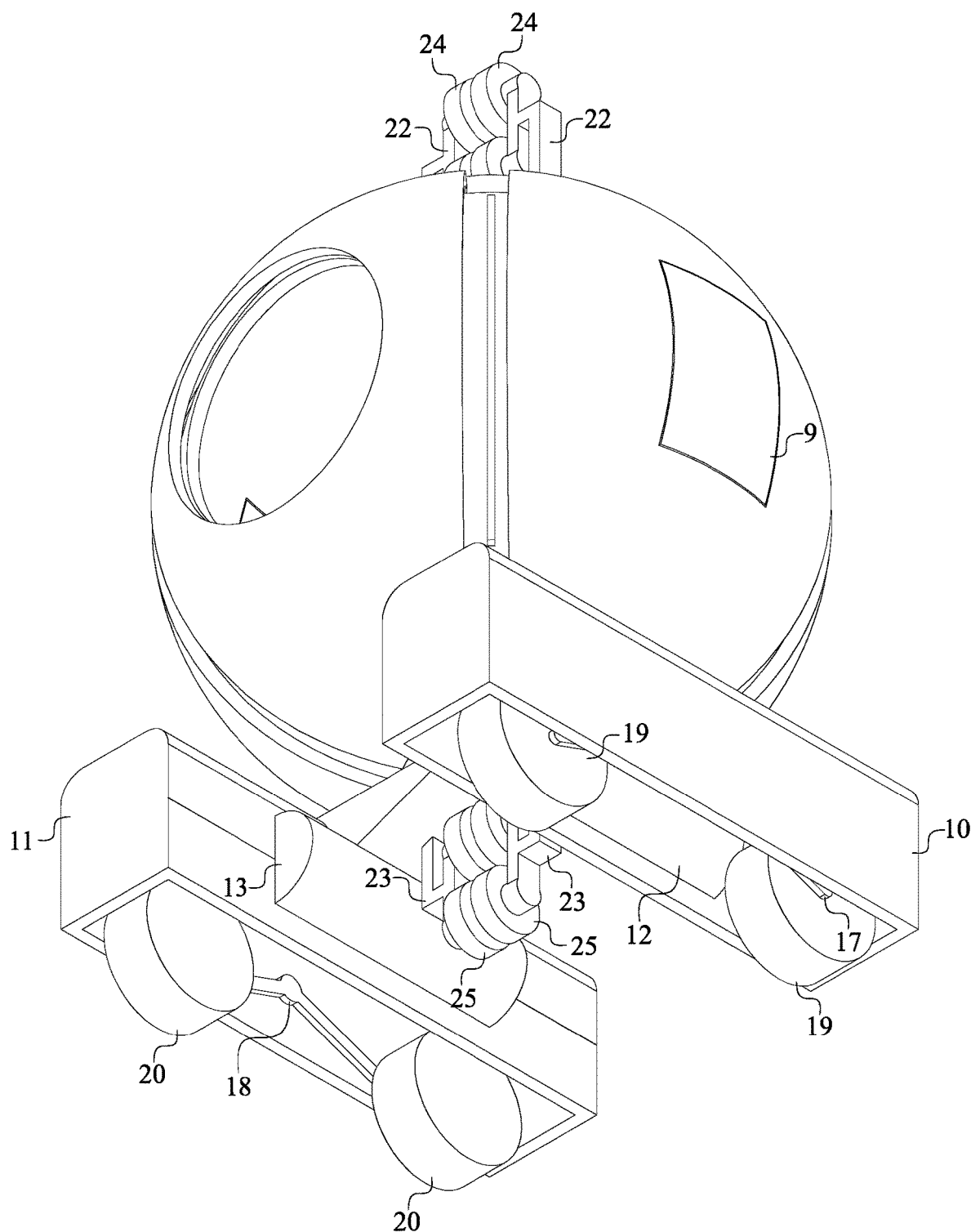
FIG. 4 is a bottom perspective view for an exemplary embodiment of the present invention.

The present invention is designed to provide a vehicle which can travel on both elevated railways and conventional roadways. In a first operational mode, the present invention functions as a wheeled electric car that can travel on conventional roadways. In a second operational mode, the present invention functions as an electrically operated pod that is guided along two elevated rails. The present invention comprises a capsule 1, a carriage 6, a left motor 12, a right motor 13, a road drive system 16, a rail drive system 21, a pod control unit 27, and at least one battery 29 as shown in FIG. 1-6. The carriage 6 comprises a spherical frame-housing 7, a left wheel housing 10, and a right wheel housing 11 as shown in FIG. 2

In reference to a general configuration of the present invention, a spherical cabin 2 of the capsule 1 is attitudinally mounted within the spherical frame-housing 7 so that the spherical cabin 2 can be freely rotated within the spherical frame-housing 7. The left motor 12 is adjacently mounted to the left wheel housing 10 so that the left motor 12 can be optimally placed to operate the road drive system 16 and the rail drive system 21. Similarly, the right motor 13 is adjacently mounted to the right wheel housing 11 so that the right motor 13 can also be optimally placed to operate the road drive system 16 and the rail drive system 21. More specifically, the left motor 12 and the right motor 13 are operatively coupled with the road drive system 16 and the rail drive system 21 through the at least one battery 29 and the pod control unit 27.

The capsule 1 is a structural member that is positioned within the carriage 6 so that the users of the present invention can be accommodated. In reference to FIG. 5, the capsule 1 further comprising at least one seat 3, a first door 4, and a second door 5 in addition to the spherical cabin 2. The spherical cabin 2 is a rigid body and functions similar to cabin of a vehicle. The at least one seat 3 is mounted within the spherical cabin 2 thus providing seating arrangements for the users of present invention. The at least one seat 3 can be a bench seat or a bucket seat, wherein the type and the exact placement of seat and is determined upon the specific usage of the present invention. The at least one seat 3 is preferably equipped with industry standard safety and comfort accessories such as seat belts, headrests, seat heaters, seat air-conditioning, multi-positioning power seat features, and any other types of seat related features. Optionally, the capsule 1 can eliminate the at least one seat 3 to accommodate wheelchairs or freights. The first door 4 and the second door 5 are hermetically integrated into the spherical cabin 2 and diametrically opposed of each other about the spherical cabin 2. The first door 4 and the second door 5 function as multiple access points for the inside of the spherical cabin 2. Resultantly, the users can get in and out of the spherical cabin 2 through the first door 4 and the second door 5 when the present invention is stationary. Furthermore, the first door 4 and the second door 5 can be manually or automatically operated within the present invention according the vehicular industry regulations.

Figure 5:
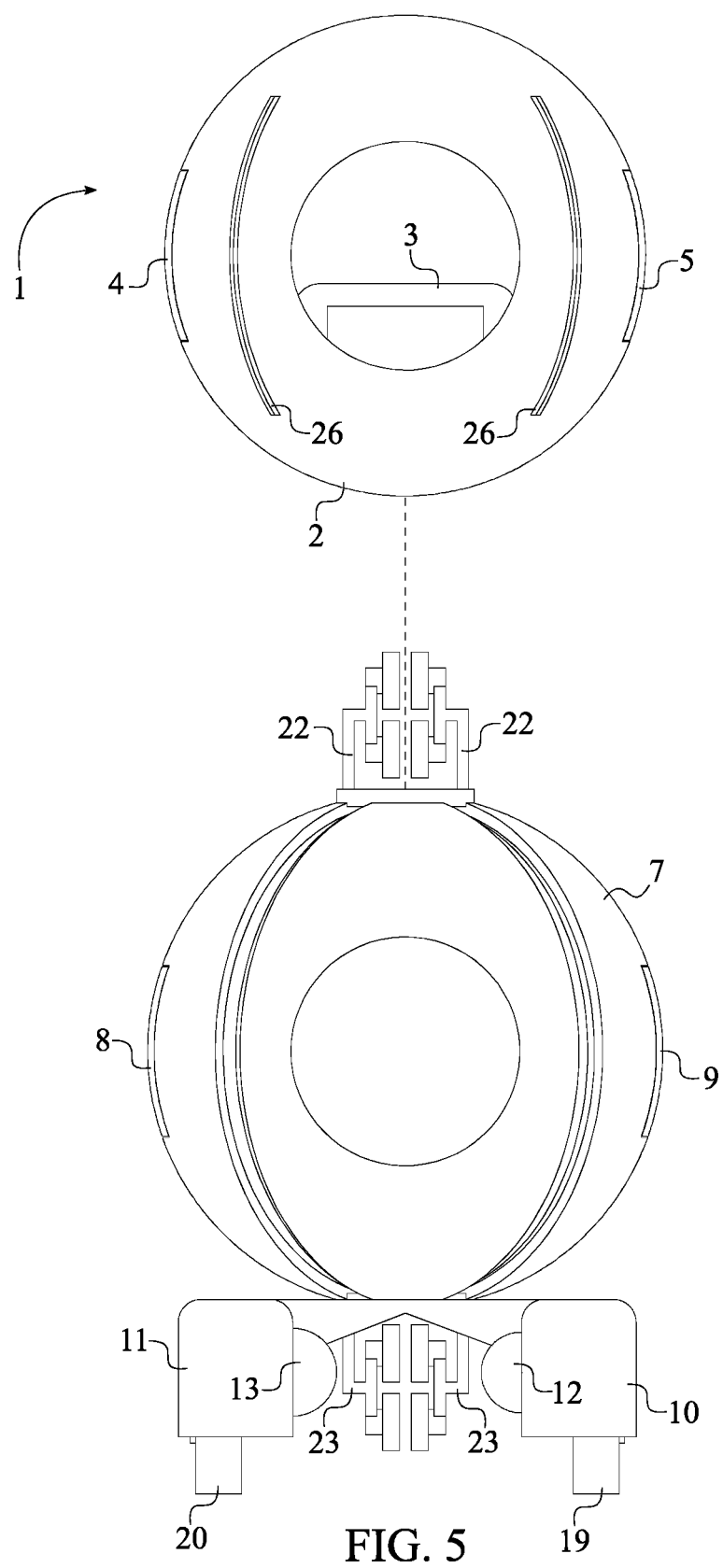
FIG. 5 is a front exploded view for an exemplary embodiment of the present invention, wherein the capsule is separated from the carriage.
Figure 6:
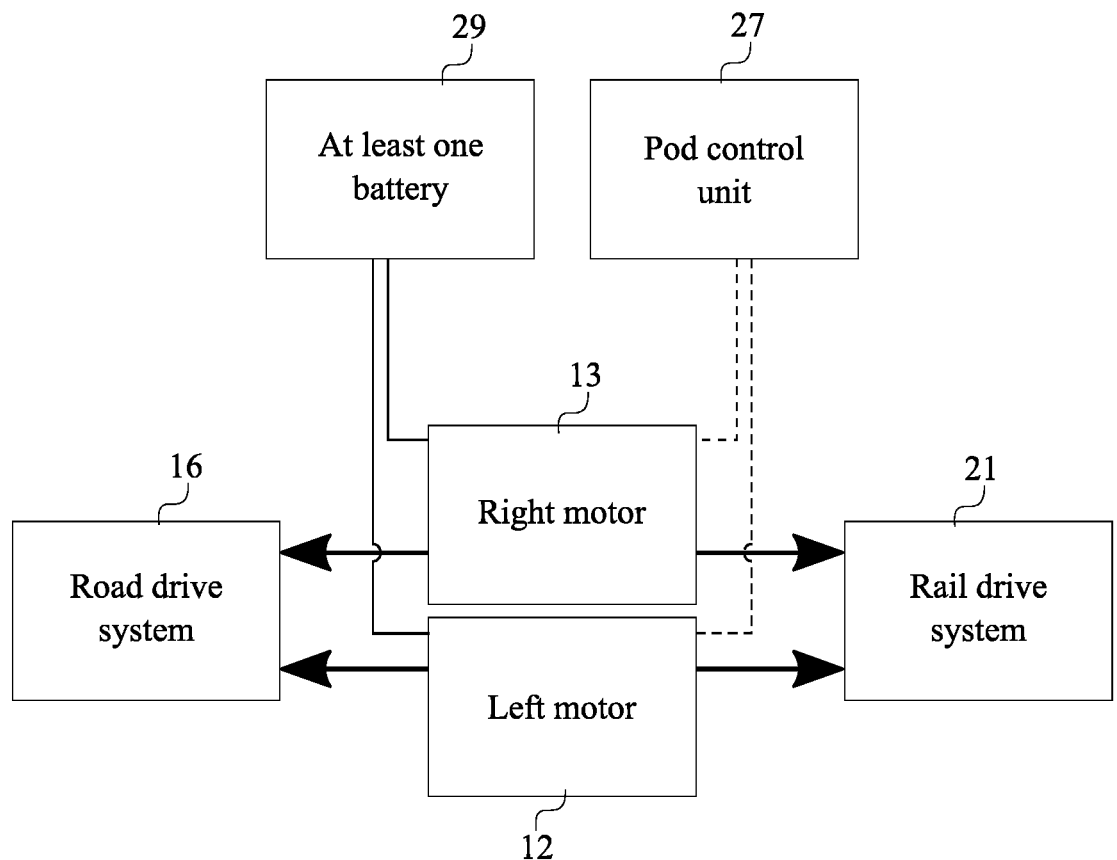
FIG. 6 is a basic schematic view showing the overall operation of the present invention.

The carriage 6 that structurally secures the capsule 1 further comprises a third door 8 and a fourth door 9 as shown in FIG. 5. The spherical cabin 2 is enclosed by the spherical frame-housing 7 so that the spherical cabin 2 can be rotated within the spherical frame-housing 7. The third door 8 and the fourth door 9 are hermetically integrated into the spherical frame-housing 7 and diametrically opposed of each other about the spherical frame-housing 7. More specifically, the third door 8 is designed to be aligned with the first door 4 so that the users of the present invention can move in and out into the spherical cabin 2 through the spherical frame-housing 7. The alignment between the first door 4 and the third door 8 is only functional when the present invention is at a stationary position thus eliminating accidental opening of the first door 4 during an operational position of the present invention. The fourth door 9 is designed to be aligned with the second door 5 so that the users of the present invention can move in and out into the spherical cabin 2 through the spherical frame-housing 7. The alignment between the second door 5 and the fourth door 9 is only functional when the present invention is at a stationary position thus eliminating accidental opening of the second door 5 during an operational position of the present invention. Preferably, the spherical frame-housing 7 is made of hollow tubular bodies, such that electrical conduits, pneumatic lines, and other necessary components can travel therein.

The left wheel housing 10 and the right wheel housing 11 are configured to enclose the road drive system 16 when not utilized within the present invention. In other words, when the rail drive system 21 is operational within the present invention, the road drive system 16 can be retractably positioned within the left wheel housing 10 and the right wheel housing 11. The left wheel housing 10 and the right wheel housing 11 are externally connected to the spherical frame-housing 7 and diametrically opposed of each other about the spherical frame-housing 7. The left wheel housing 10 and the right wheel housing 11 are preferably formed into an elongated rectangular shape so that the complete road drive system 16 can be retracted and hidden within.

Figure 7:
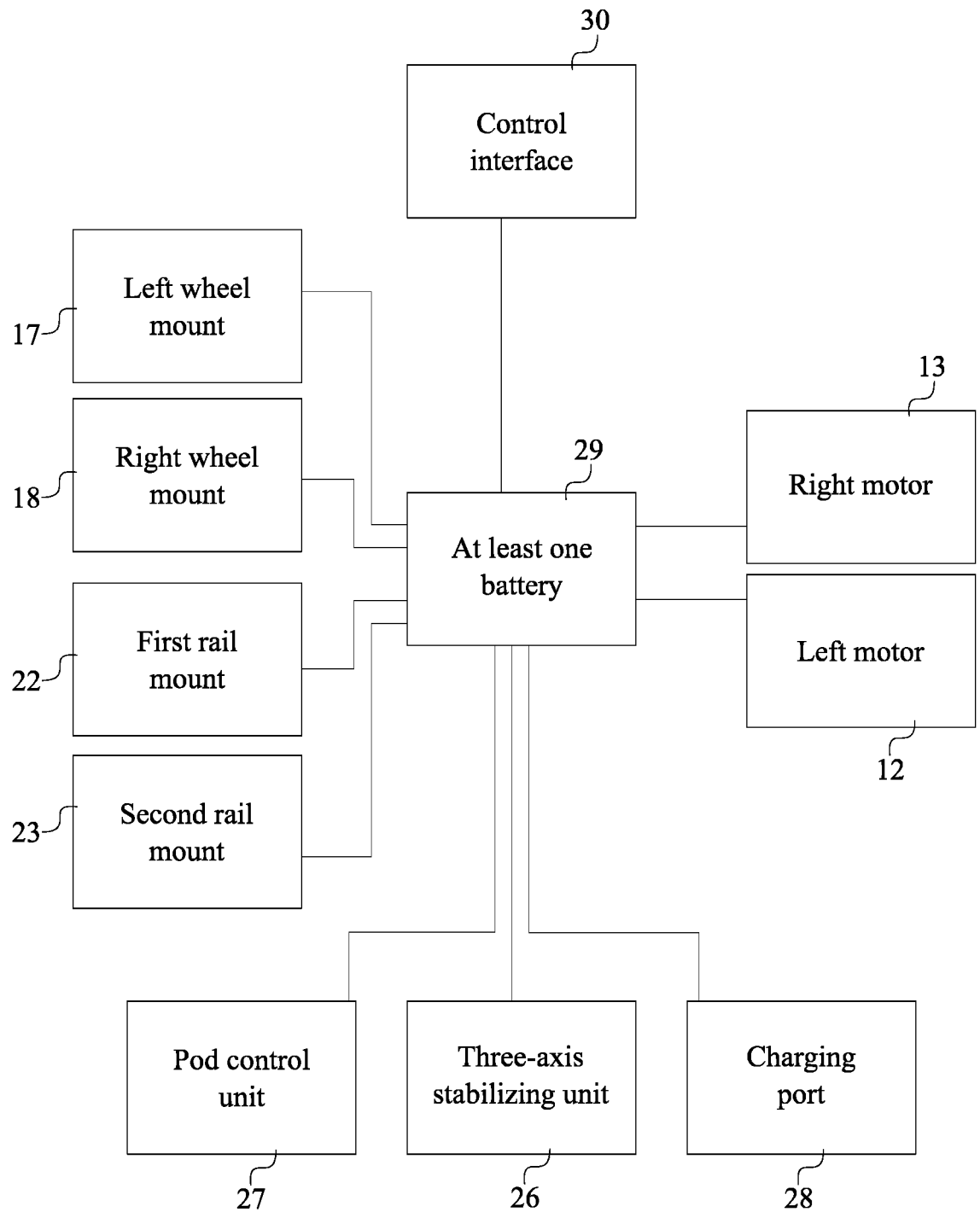
FIG. 7 is a basic schematic view showing the electrical connections of the present invention.
Figure 8:
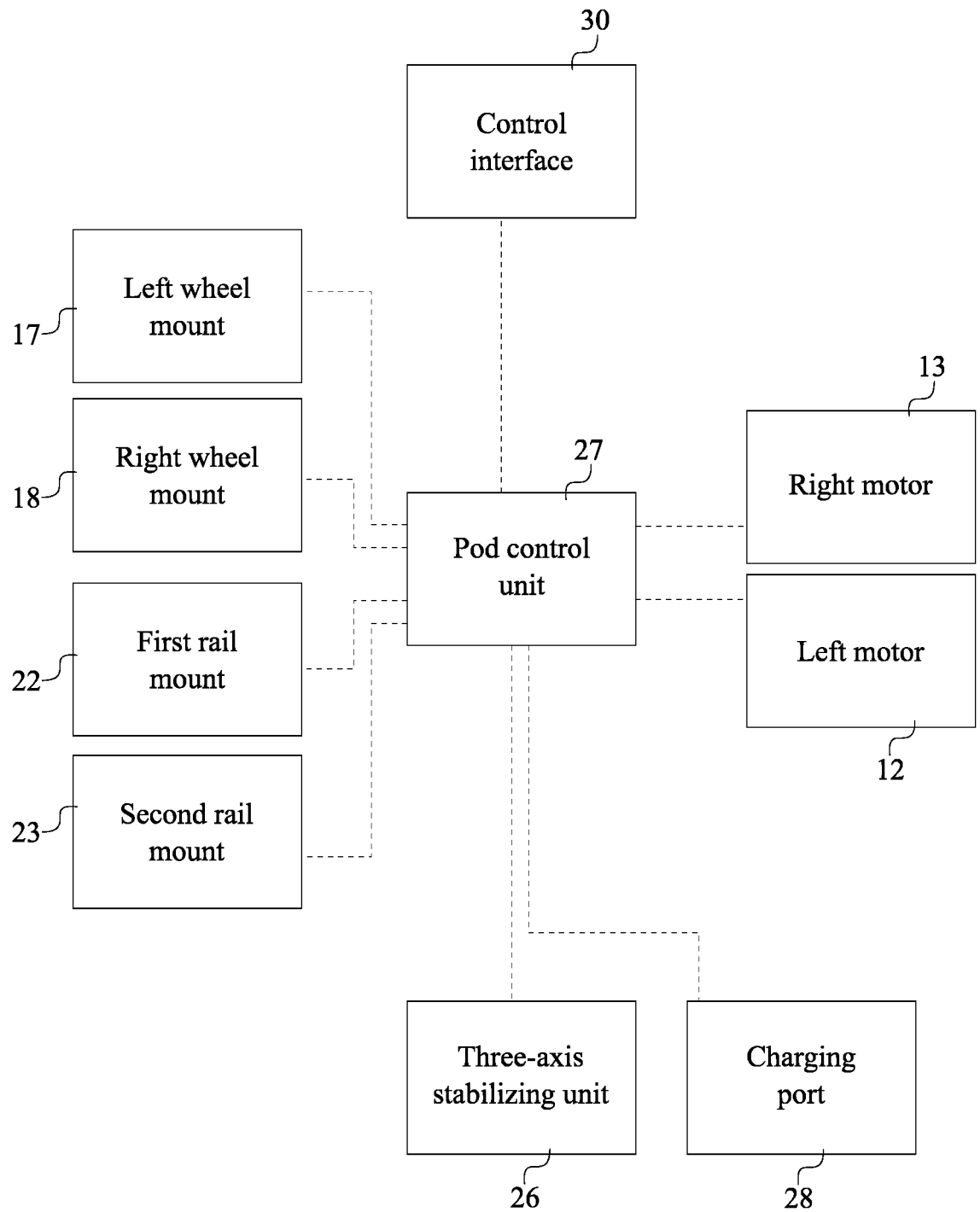
FIG. 8 is a basic schematic view showing the electronical connections of the present invention.
Figure 9:
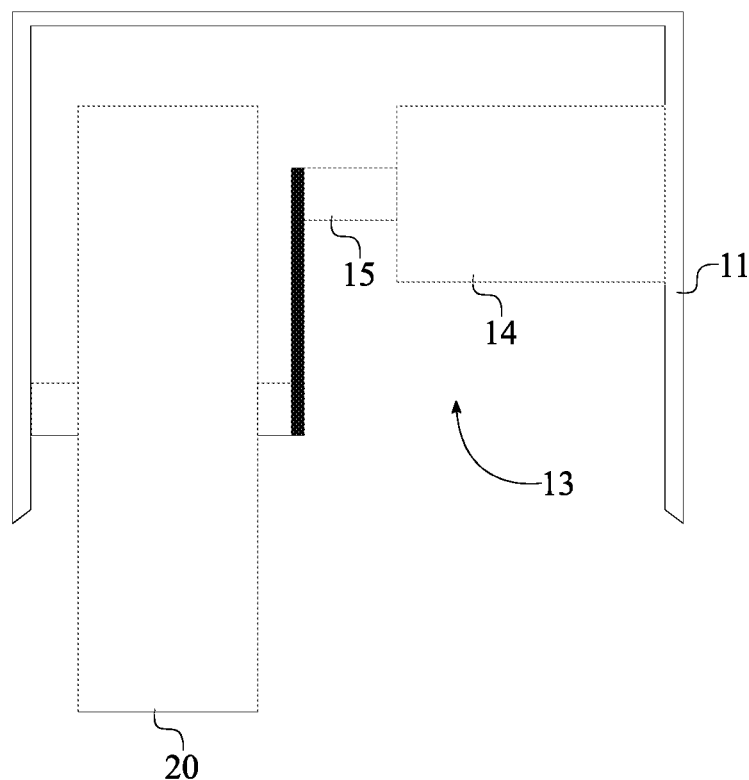
FIG. 9 is a basic schematic view showing the torsional connection between the right motor and the right wheel assembly of the present invention.
Figure 10:
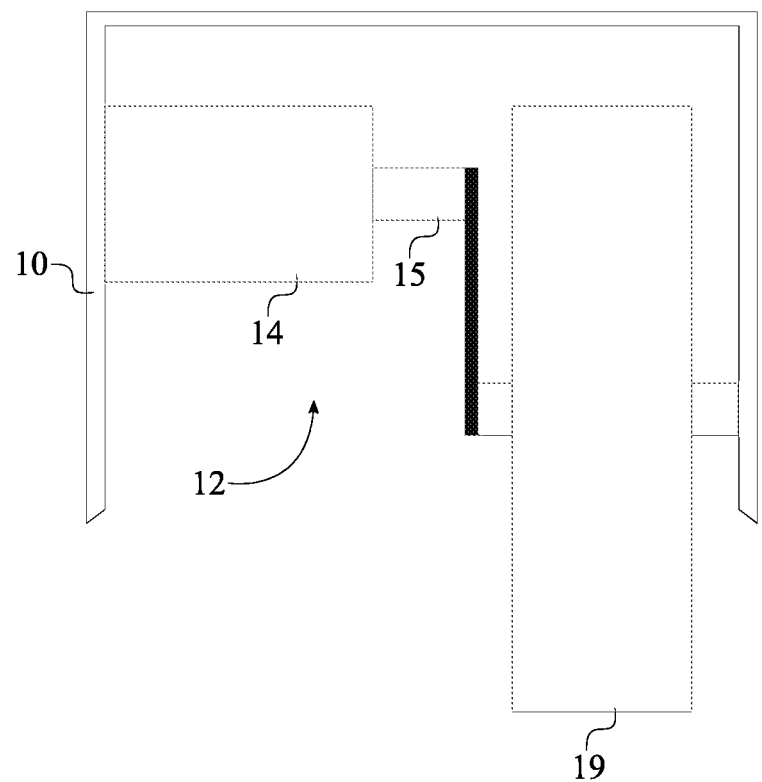
FIG. 10 is a basic schematic view showing the torsional connection between the left motor and the left wheel assembly of the present invention.

In reference to FIG. 7-8, the present invention further comprises a control interface 30 that functions a graphical user interface. The control interface 30 is utilized within the present invention so that the user of the present invention can input all of the operational commands. The control interface 30 is mounted within the spherical cabin 2 and positioned adjacent to the at least one seat 3, allowing easy access for the users. The control interface 30 is electrically connected to the at least one battery 29 and electronically connected to the pod control unit 27 to fully execute the operational commands of the present invention. More specifically, once the operational commands are inputted through the control interface 30, the operational commands are electronically sent and executed through the pod control unit 27. For example, the road drive system 16 is selected through the control interface 30, the pod control unit 27 activates the road drive system 16 and deactivates the rail drive system 21 so that the present invention can be operational within conventional roadways.

The left motor 12 and the right motor 13 are the primary drivetrain of the present invention as the road drive system 16 and the rail drive system 21 are powered through the left motor 12 and the right motor 13. In reference to FIG. 7-8, the left motor 12 and the right motor 13 are electrically connected to the at least one battery 29 thus converting the electrical energy to rotational kinetic energy. Furthermore, the left motor 12 and the right motor 13 are electronically connected to the pod control unit 27, wherein the pod control unit 27 selectively operates the left motor 12 and the right motor 13 according user's inputs. For example, rotational direction of the left motor 12 and the right motor 13 are controlled through the pod control unit 27 as the at least one battery 29 continuously powers the left motor 12 and the right motor 13.

The pod control unit 27 functions similar to electronic control unit of vehicle. As a result, the pod control unit 27 is able to control and implement vehicular electrical systems of the present invention. The at least one battery 29 is electrically connected to the pod control unit 27, as shown in FIG. 7-8, so that the pod control unit 27 can be powered within the present invention.

The present invention further comprises a charging port 28 as shown in FIG. 7-8. The charging port 28 is electrically connected to the at least one battery 29 so that the at least one battery 29 can be charged with an external electrical charger or charging station. The charging port 28 is electronically connected to the pod control unit 27 so that overcharging of the at least one battery 29 can be eliminated. For example, when the at least one battery 29 is fully charged through an external electrical charger or charging station, the pod control unit 27 detects that the battery 29 is fully charged and stops the charging process to eliminate overcharging of the at least one battery 29.

The present invention further comprises a three-axis stabilizing unit 26 that functions as an attitude control in which the capsule 1 is held fixed in the desired orientation without any rotation while the carriage 6 spins and rotates around the capsule 1. Preferably, propulsion system thrusters are utilized within the present invention as the three-axis stabilizing unit 26 to maintain a fixed position for the capsule 1. In reference to FIG. 5 and FIG. 7-8, the three-axis stabilizing unit 26 is mounted onto the spherical cabin 2. The three-axis stabilizing unit 26 is electrically connected to the at least one battery 29 and electronically connected to the pod control unit 27. As a result, when the present invention is operational, the pod control unit 27 is able to continuously identify the orientation of the capsule 1 with respect to the orientation of the carriage 6 so that the continuous operation of the three-axis stabilizing unit 26 can maintain a fixed position for the capsule 1.

The road drive system 16 comprises a left wheel mount 17, a right wheel mount 18, a left wheel assembly 19, and a right wheel assembly 20 as shown in FIG. 7-10. The left wheel mount 17 is retractably mounted within the left wheel housing 10 and functions as the supporting structure to install the left wheel. The left wheel assembly 19 is rotatably connected to the left wheel mount 17 thus resulting the left wheel assembly 19 to rotate about the left wheel mount 17. More specifically, a stator 14 of the left motor 12 is mounted to the left wheel housing 10 in order to secure the left motor 12 to the present invention and to allow a rotor 15 of the left motor 12 to converts the electrical energy to rotational kinetic energy. The rotor 15 of the left motor 12 is torsionally connected to the left wheel assembly 19 so that the rotational kinetic energy of the left motor 12 can be transferred to the left wheel. The right wheel mount 18 is retractably mounted within the right wheel housing 11 and functions as the supporting structure to install the right wheel. The right wheel assembly 20 is rotatably connected to the right wheel mount 18 thus resulting the right wheel assembly 20 to rotate about the right wheel mount 18. More specifically, a stator 14 of the right motor 13 is mounted to the right wheel housing 11 in order to secure the right motor 13 to the present invention and to allow a rotor 15 of the right motor 13 to converts the electrical energy to rotational kinetic energy. The rotor 15 of the right motor 13 is torsionally connected to the right wheel assembly 20 so that the rotational kinetic energy of the right motor 13 can be transferred to the right wheel. The preset invention can utilize any types of industry standard torsional connections to respectively transfer the rotational kinetic energy of the left motor 12 and the right motor 13 to the left wheel assembly 19 and the right wheel assembly 20. For example, a direct-drive system, a gear driven system, a chain driven system, a belt driven system, or any other types of related torsional systems.

In reference to FIG. 7-8, the left wheel mount 17 and the right wheel mount 18 are electrically connected to the at least one battery 29. In reference to FIG. 7-8, the left wheel mount 17 and the right wheel mount 18 are also electronically connected to the pod control unit 27. As a result, the at least one battery 29 and the pod control unit 27 are able to execute the automated operation of the left wheel mount 17 and the right wheel mount 18 through the control interface 30. More specifically, a folded position and an unfolded position of the left wheel mount 17 and the right wheel mount 18 are executed through the pod control unit 27 according to user's input command through the control interface 30.

In reference to the first operational mode, the left motor 12 and the right motor 13 are powered by the at least one battery 29 as the left wheel mount 17 and the right wheel mount 18 are in the unfolded position. Resultantly, the left wheel assembly 19 and the right wheel assembly 20 are able to drive the present invention on the conventional roadways as an electric vehicle. All of the vehicular electrical systems are controlled/inputted through the control interface 30 while the pod control unit 27 executes the vehicular electrical systems. Preferably, the present is an autonomous electric vehicle when running on the conventional roadways and may further comprise a variety of related components to enable autonomous driving capabilities. For example, the present invention may comprise radar, cameras, Lidar, sonar, GPS, and other necessary sensors and modules.

Figure 11:
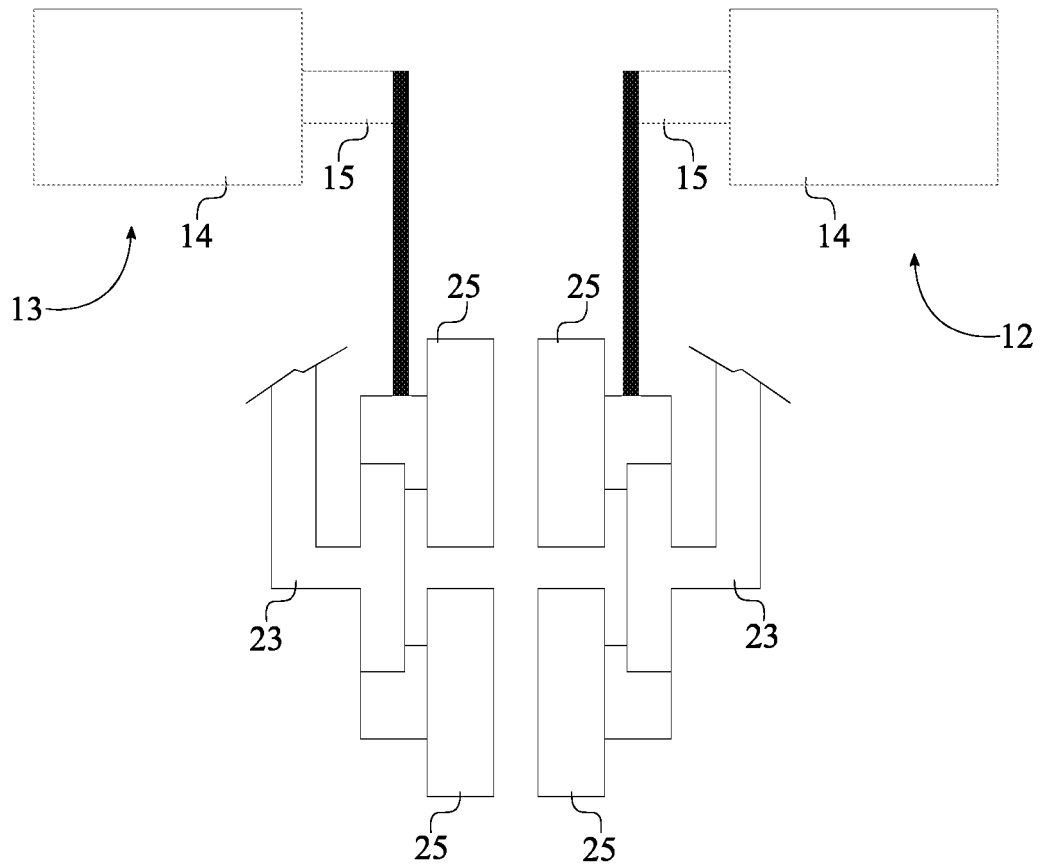
FIG. 11 is a basic schematic view showing the torsional connection between the left motor, the right motor, and the plurality of second rail wheels of the present invention.

In a preferred embodiment, the rail drive system 21 comprises a first rail mount 22, a second rail mount 23, a plurality of first rail wheels 24, and a plurality of second rail wheels 25 as shown in FIG. 2 and FIG. 11. The first rail mount 22 and the second rail mount 23 are diametrically opposed of each other about the spherical frame-housing 7 so that the present invention can be operated or guided along the two elevated rails. In other words, the second rail mount 23 is symmetrically positioned in between the left wheel housing 10 and the right wheel housing 11. Due to the dimetric positioning of the first rail mount 22, the first rail mount 22 is offset from the left wheel housing 10 and the right wheel housing 11. More specifically, the first rail mount 22 is connected onto the spherical frame-housing 7 and functions as the supporting structure to install the plurality of first rail wheels 24 and the engaging clamp between a first rail of the two elevated rails. The plurality of first rail wheels 24 is rotatably connected to the first rail mount 22 thus resulting the plurality of first rail wheels 24 to be powered and operational along the first rail. The second rail mount 23 is connected onto the spherical frame-housing 7 and functions as the supporting structure to install the plurality of second rail wheels 25 and the engaging clamp between a second rail of the two elevated rails. The plurality of second rail wheels 25 is rotatably connected to the second rail mount 23 thus resulting the plurality of second rail wheels 25 to be powered and operational along the second rail. Preferably, the first rail mount 22 and the second rail mount 23 each comprises a pair of brackets that enables the present invention to be secured to the corresponding rail via the plurality of first rail wheels 24 and the plurality of second rail wheels 25, respectively. More specifically, the rotor 15 of the left motor 12 and the right motor 13 are torsionally connected to the plurality of second rail wheels 25 so that the rotational kinetic energy of the left motor 12 and the right motor 13 can be transferred to the plurality of second rail wheels 25 that move along the second rail. The preset invention can utilize any types of industry standard torsional connections to transfer the rotational kinetic energy of the left motor 12 and the right motor 13 to the plurality of second rail wheels 25. For example, a direct-drive system, a gear driven system, a chain driven system, a belt driven system, or any other types of related torsional systems. Preferably, the plurality of first rail wheels 24 and the plurality of second rail wheels 25 are at least two pair of rail wheels that is positioned parallel to the normal, runs along the second rail, and electrically powered through the left motor 12 and the right motor 13. As the primary power source, the left motor 12 and the right motor 13 can be electrically powered from an external electrical conduit in order to drive the plurality of second rail wheels 25. However, as the secondary power source, the left motor 12 and the right motor 13 can also be electrically powered from the at least one battery 29 in order to drive the plurality of second rail wheels 25.

In reference to FIG. 7-8, the first rail mount 22 and the second rail mount 23 are electrically connected to the at least one battery 29. In reference to FIG. 7-8, the first rail mount 22 and the second rail mount 23 are also electronically connected to the pod control unit 27. As a result, the at least one battery 29 and the pod control unit 27 are able to execute the automated engagement of the first rail mount 22 to the first rail and the second rail mount 23 to the second rail through the control interface 30. More specifically, an engage configuration and a disengaged configuration of the first rail mount 22 and the second rail mount 23 are individually executed through the pod control unit 27 according to user's input command through the control interface 30.

In reference to a primary configuration of the second operational mode, the left motor 12 and the right motor 13 are powered by the at least one battery 29 as the first rail mount 22 and the second rail mount 23 are in the engaged configuration. Depending upon user's input commands or regulated safety parameters, the plurality of second rail wheels 25 is able to drive the present invention on the second rail of the two elevated rails as an electric vehicle. Simultaneously, the first rail mount 22 and the plurality of first rail wheels 24 function as a stabilizing arm with respect to the first rail of the two elevated rails. All of the vehicular electrical systems are controlled/inputted through the control interface 30 while the pod control unit 27 executes the vehicular electrical systems. Preferably, the present is an autonomous electric vehicle when running on the two elevated rails and may further comprise a variety of related components to enable autonomous driving capabilities. For example, the present invention may comprise radar, cameras, Lidar, sonar, GPS, and other necessary sensors and modules. Depending upon the environmental regulations, safety regulations, or any other rules or regulations, the positioning of the first rail and the second rail can be towards a top end of the capsule 1 or a bottom end of the capsule 1. For example, when the present invention is configured to drive on the second rail, the capsule 1 and the carriage 6 have to be positioned atop the second rail, the second rail has to be positioned below the at least one seat 3, and the first rail mount 22 and the plurality of first rail wheels 24 need to function as the stabilizing arm. However, when the present invention is configured to hang from the second rail, the capsule 1 and the carriage 6 have to be positioned below the second rail and the second rail has to be positioned above the at least one seat 3. If the first rail is present within the hanging configuration of the present invention, the first rail mount 22 and the plurality of first rail wheels 24 function as the stabilizing arm with the first rail. If the first rail is not present within the hanging configuration of the present invention, the first rail mount 22 and the plurality of first rail wheels 24 function hang free from the second rail.

Furthermore, a helical orientation of the first rail and the second rail is able to continuously orient the second rail from the bottom of the at least one seat 3 to the top of the at least one seat 3 while the first rail continuously orient from the top of the at least one seat 3 to the bottom of the at least one seat 3. Due to the three-axis stabilizing unit 26, the capsule 1 is held fixed in the desired orientation without any rotation while the carriage 6 spins and rotates around the capsule 1 about the helical orientation of the first rail and the second rail.

In an alternative embodiment, the rail drive system 21 comprises a top rail mount, a bottom rail mount, a top motor, a top drive assembly, and a bottom drive assembly. The top rail mount and the bottom rail mount are diametrically opposed of each other about the spherical frame-housing 7 so that the present invention can be operated or guided along the two elevated rails. In other words, the bottom rail mount is symmetrically positioned in between the left wheel housing 10 and the right wheel housing 11 thus delineating a bottom half of the carriage 6. Due to the dimetric positioning of the top rail mount, the top rail mount is offset from the left wheel housing 10 and the right wheel housing 11 thus delineating a top half of the carriage 6. More specifically, the top rail mount is connected onto the spherical frame-housing 7 and functions as the supporting structure to install the top drive assembly and the engaging clamp between a top rail of the two elevated rails. A stator of the top motor is mounted onto the top rail mount as a rotor of the top motor is torsionally connected to the top drive assembly. The top drive assembly is rotatably connected to the top rail mount thus resulting the top drive assembly to be powered and operational along the top rail. Preferably, the top drive assembly is a pair of support wheels that is angled 30 degrees off horizontal plane, runs along the top rail, and electrically powered from an external electrical conduit of the top rail via the top motor. The bottom rail mount is connected onto the spherical frame-housing 7 and functions as the supporting structure to install the bottom drive assembly and the engaging clamp between a bottom rail of the two elevated rails. The bottom drive assembly is rotatably connected to the bottom rail mount thus resulting the bottom drive assembly to be powered and operational along the bottom rail. Preferably, the bottom drive assembly is a pair of support wheel that is positioned perpendicular to the normal, runs along the bottom rail, and electrically powered through the left motor 12 and the right motor 13. More specifically, the rotor 15 of the left motor 12 and the right motor 13 are torsionally connected to the bottom drive assembly so that the rotational kinetic energy of the left motor 12 and the right motor 13 can be transferred to the bottom drive assembly move along the bottom rail. The preset invention can utilize any types of industry standard torsional connections to transfer the rotational kinetic energy of the left motor 12 and the right motor 13 to the bottom drive assembly. For example, a direct-drive system, a gear driven system, a chain driven system, a belt driven system, or any other types of related torsional systems.

The top drive assembly and the bottom drive assembly can be independently or jointly operated within the present invention. For example, in some embodiment, the present invention only utilizes the top drive assembly that is operational through the external electrical conduit to move along the two elevated rails while the bottom drive assembly becomes non-operational and functions as a lateral guide mechanism. In some embodiment, the present invention only utilizes the bottom drive assembly that is operational through left motor 12 and the right motor 13 to move along the two elevated rails while the top drive assembly becomes non-operational and functions as a lateral guide mechanism. In some embodiment, the present invention utilizes the top drive assembly that is operational through the external electrical conduit and the bottom drive assembly that is operational through left motor 12 and the right motor 13 to move along the two elevated rails.

The top rail mount and the bottom rail mount are electrically connected to the at least one battery 29. The top rail mount and the bottom rail mount are also electronically connected to the pod control unit 27. As a result, the at least one battery 29 and the pod control unit 27 are able to execute the automated engagement of the top rail mount to the top rail and the bottom rail mount to the bottom rail through the control interface 30. More specifically, an engage configuration and a disengaged configuration of the top rail mount and the bottom rail mount are individually executed through the pod control unit 27 according to user's input command through the control interface 30.

In reference to an alternative configuration of the second operational mode, the left motor 12 and the right motor 13 are powered by the at least one battery 29 as the bottom rail mount and the top rail mount are in the engaged configuration. Depending upon user's input commands or regulated safety parameters, the top drive assembly and the bottom drive assembly are able to individually or jointly drive the present invention on the two elevated rails as an electric vehicle. All of the vehicular electrical systems are controlled/inputted through the control interface 30 while the pod control unit 27 executes the vehicular electrical systems. Preferably, the present is an autonomous electric vehicle when running on the two elevated rails and may further comprise a variety of related components to enable autonomous driving capabilities. For example, the present invention may comprise radar, cameras, Lidar, sonar, GPS, and other necessary sensors and modules.

Furthermore, the present invention equipped with a plurality of vehicular accessory and safety system such as air conditioning/heating systems, entertaining systems, illuminating systems, a regenerative braking system, traction control systems, an exhaust system, a steering system, a suspension system, and any other types of vehicular related systems that are required and known within the vehicular industry.

Although the invention has been explained in relation to its preferred embodiment, it is to be understood that many other possible modifications and variations can be made without departing from the spirit and scope of the invention as hereinafter claimed.

What is claimed is:

1. A dual mode vehicle that operates on both guided rails and unguided roadways comprising:
    a capsule;
    a carriage;
    a left motor;
    a right motor;
    a road drive system;
    a rail drive system;
    a pod control unit;
    at least one battery;
    the carriage comprising a spherical frame-housing, a left wheel housing, and a right wheel housing;
    a spherical cabin of the capsule being attitudinally mounted within the spherical frame-housing;
    the left motor being adjacently mounted to the left wheel housing;
    the right motor being adjacently mounted to the right wheel housing;
    the left motor and the right motor being operatively coupled with the road drive system through the at least one battery and the pod control unit; and
    the left motor and the right motor being operatively coupled with the rail drive system through the at least one battery and the pod control unit.

2. The dual mode vehicle that operates on both guided rails and unguided roadways as claimed in claim 1 comprising:
    the capsule further comprising at least one seat, a first door, and a second door;
    the at least one seat being mounted within the spherical cabin;
    the first door and the second door being hermetically integrated into the spherical cabin; and
    the first door and the second door being diametrically opposed of each other about the spherical cabin.

3. The dual mode vehicle that operates on both guided rails and unguided roadways as claimed in claim 1 comprising:
    the carriage further comprising a third door and a fourth door;
    the spherical cabin being enclosed by the spherical frame-housing;
    the third door and the fourth door being hermetically integrated into the spherical frame-housing; and
    the third door and the fourth door being diametrically opposed of each other about the spherical frame-housing.

4. The dual mode vehicle that operates on both guided rails and unguided roadways as claimed in claim 1 comprising:
    the left wheel housing and the right wheel housing being externally connected to the spherical frame-housing; and
    the left wheel housing and the right wheel housing being diametrically opposed of each other about the spherical frame-housing.

5. The dual mode vehicle that operates on both guided rails and unguided roadways as claimed in claim 1 comprising:
    the left motor being electrically connected to the at least one battery;
    the right motor being electrically connected to the at least one battery;
    the left motor being electronically connected to the pod control unit; and
    the right motor being electronically connected to the pod control unit.

6. The dual mode vehicle that operates on both guided rails and unguided roadways as claimed in claim 1 comprising:
    the road drive system comprising a left wheel mount, a right wheel mount, a left wheel assembly, and a right wheel assembly;
    the left wheel mount being retractably mounted within the left wheel housing;
    the left wheel assembly being rotatably connected to the left wheel mount;
    the right wheel mount being retractably mounted within the right wheel housing; and
    the right wheel assembly being rotatably connected to the right wheel mount.

7. The dual mode vehicle that operates on both guided rails and unguided roadways as claimed in claim 6 comprising:
    a stator of the left motor being mounted to the left wheel housing;
    a rotor of the left motor being torsionally connected to the left wheel assembly;
    a stator of the right motor being mounted to the right wheel housing; and
    a rotor of the right motor being torsionally connected to the right wheel assembly.

8. The dual mode vehicle that operates on both guided rails and unguided roadways as claimed in claim 6 comprising:
    the left wheel mount being electrically connected to the at least one battery;
    the right wheel mount being electrically connected to the at least one battery;
    the left wheel mount being electronically connected to the pod control unit; and
    the right wheel mount being electronically connected to the pod control unit.

9. The dual mode vehicle that operates on both guided rails and unguided roadways as claimed in claim 1 comprising:
    the rail drive system comprising a first rail mount, a second rail mount, a plurality of first rail wheels, and a plurality of second rail wheels;
    the first rail mount and the second rail mount being diametrically opposed of each other about the spherical frame-housing;
    the first rail mount being connected onto the spherical frame-housing;
    the second rail mount being connected to the spherical frame-housing;
    the second rail mount being symmetrically positioned in between the left wheel housing and the right wheel housing;
    the plurality of first rail wheels being rotatably connected to the first rail mount; and
    the plurality of second rail wheels being rotatably connected to the second rail mount.

10. The dual mode vehicle that operates on both guided rails and unguided roadways as claimed in claim 9, wherein a rotor of the left motor and the right motor are torsionally connected to the plurality of second rail wheels.

11. The dual mode vehicle that operates on both guided rails and unguided roadways as claimed in claim 9, wherein the left motor and the right motor are electrically powered from an external electrical conduit.

12. The dual mode vehicle that operates on both guided rails and unguided roadways as claimed in claim 9 comprising:
- the first rail mount being electrically connected to the at least one battery;
- the second rail mount being electrically connected to the at least one battery;
- the first rail mount being electronically connected the pod control unit; and
- the second rail mount being electronically connected to the pod control unit.

13. The dual mode vehicle that operates on both guided rails and unguided roadways as claimed in claim 1 comprising:
- a three-axis stabilizing unit;
- the three-axis stabilizing unit being mounted onto the spherical cabin;
- the three-axis stabilizing unit being electrically connected to the at least one battery; and
- the three-axis stabilizing unit being electronically connected to the pod control unit.

14. The dual mode vehicle that operates on both guided rails and unguided roadways as claimed in claim 1 comprising:
- a control interface;
- the control interface being mounted within the spherical cabin;
- the control interface being electrically connected to the at least one battery; and
- the control interface being electronically connected to the pod control unit.

15. The dual mode vehicle that operates on both guided rails and unguided roadways as claimed in claim 1 comprising:
- a charging port;
- the charging port being electrically connected to the at least one battery; and
- the charging port being electronically connected to the pod control unit.

16. The dual mode vehicle that operates on both guided rails and unguided roadways as claimed in claim 1, wherein the at least one battery is electrically connected to the pod control unit.

* * * * *